No. 624,856. Patented May 9, 1899.
F. PARER.
CASH REGISTER.
(Application filed Nov. 28, 1898.)
(No Model.) 2 Sheets—Sheet 1.
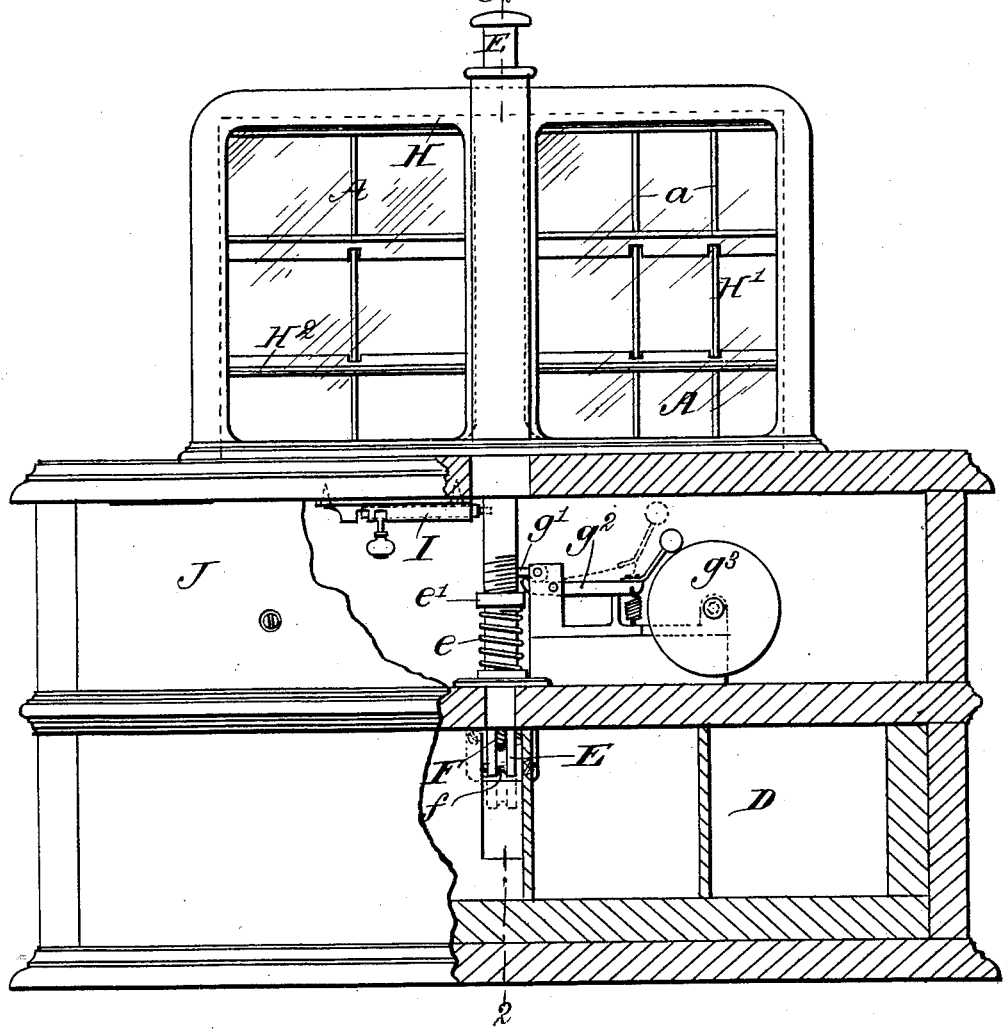
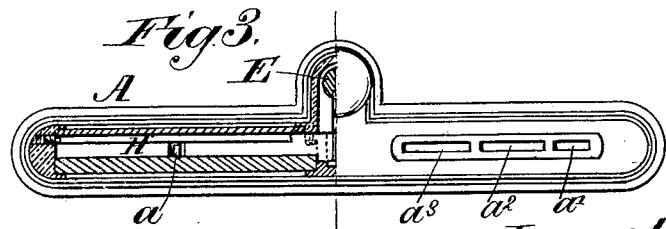
Witnesses.
Robert Everett.
H. B. Keefer.
Inventor
Francis Parer.
By James L. Norris.
Atty.

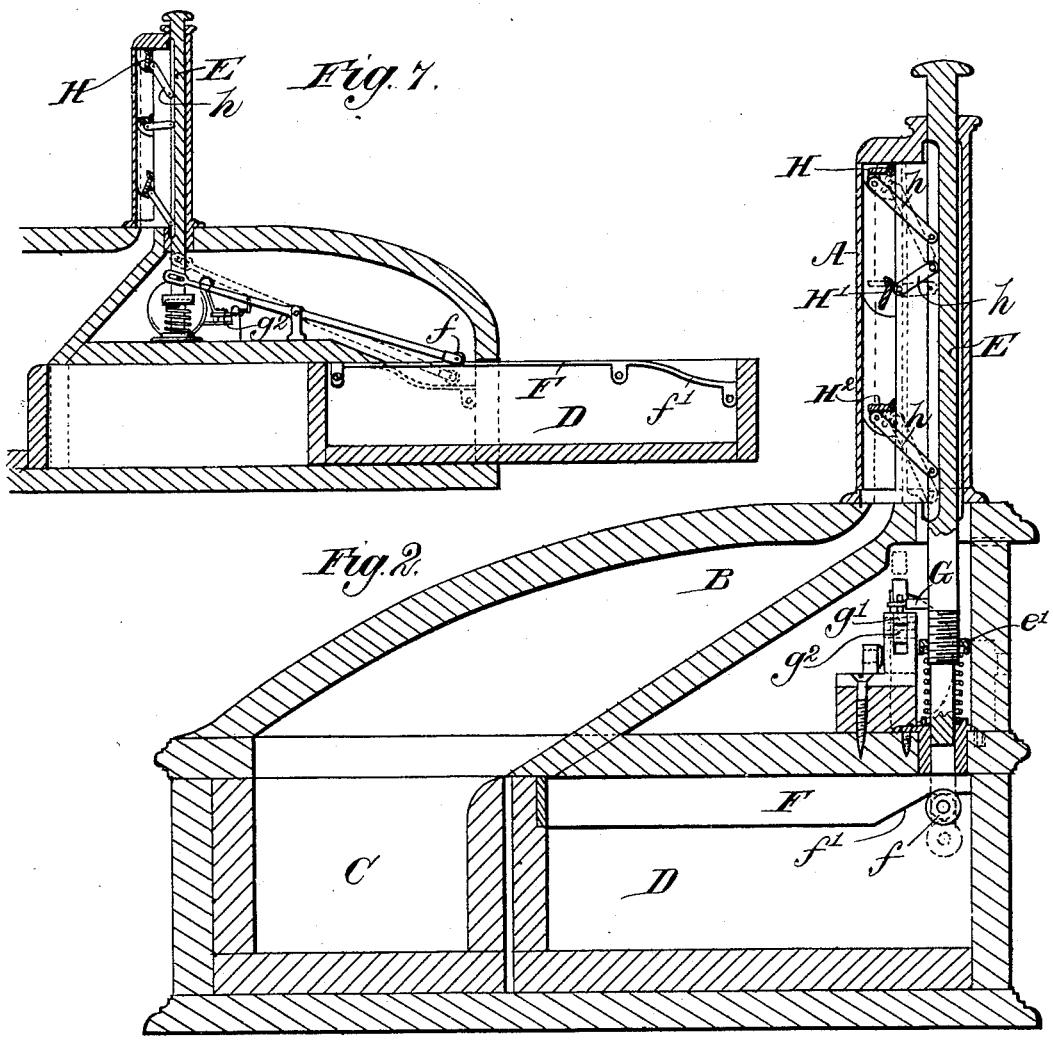

UNITED STATES PATENT OFFICE.

FRANCIS PARER, OF QUEENSTOWN, TASMANIA.

CASH-REGISTER.

SPECIFICATION forming part of Letters Patent No. 624,856, dated May 9, 1899.

Application filed November 28, 1898. Serial No. 697,685. (No model.)

*To all whom it may concern:*

Be it known that I, FRANCIS PARER, barman, a subject of the Queen of Great Britain, and a resident of Smelters' Hotel, Queenstown, in the British Colony of Tasmania, temporarily residing at the Exchange Hotel, corner of Swanston and Little Collins streets, Melbourne, in the British Colony of Victoria, have invented an Improved Sight-Payment Cash Receiver and Indicator for Counter Use, (for which I applied for a patent in Victoria on the 11th day of May, 1898, No. 15,175; in New South Wales on the 12th day of May, 1898, No. 8,357, and in Great Britain on the 14th day of June, 1898, No. 13,303,) of which the following is a specification.

This invention relates to those classes of cash receivers and indicators which are intended for use on counters in shops, hotels, and the like. Its object is to dispense with the complicated and expensive mechanism at present in use in cash registers and indicators for checking or recording and indicating the amounts paid into the machine.

According to my invention the amount of each sale is indicated by the cash itself being exposed to view, while the total takings pass into a drawer or compartment which is under the sole control of the proprietor or other authorized person, a separate drawer or compartment being provided to contain the necessary supply of change. By this means it is obvious that employees cannot become acquainted with the amount of the takings or handle the cash after it has been placed in the receiver.

Mechanism is provided whereby a bell or gong may be sounded each time that a coin is placed in the machine, as well as whenever the change-drawer is opened.

An arrangement of pivoted shelves is fitted within a transparent receptacle which is in full view of the customer and into which the amount of the customer's purchase is placed. These pivoted shelves are connected to a plunger which actuates the gong, so that the salesman is forced to depress said plunger, and thus sound the gong before he can place the coin in the transparent receptacle.

In order that the invention may be clearly understood, I will describe it by reference to the accompanying drawings, in which—

Figure 1 represents a front elevation, partly in section, of my improved sight-payment cash receiver and indicator for counter use. Fig. 2 is a vertical transverse section on line 2 2, Fig. 1. Fig. 3 is a part horizontal section and part plan of the transparent receptacle into which the amount of the customer's purchase is placed by the salesman. Fig. 4 is a plan of the gong-sounding mechanism. Figs. 5 and 6 are respectively a front elevation and a plan of part of one of the pivoted shelves used in the transparent receptacle. Fig. 7 is a view showing a slight modification of one part of the mechanism.

A represents the transparent receptacle, into which the amount of the customer's purchase has to be placed by the salesman. From this receptacle a passage B leads to a drawer C, which is secured by a lock or otherwise, so that it cannot be opened except by the proprietor or other authorized person.

D represents a drawer which can be opened by the salesman and which contains a given supply of change in different compartments. A vertically-sliding plunger E is mounted in some convenient position—as, for instance, alongside the transparent coin-receptacle A. This plunger is normally held in its raised position by a spiral spring $e$, whose strength can be regulated by means of an adjustable nut $e'$ upon said plunger. The lower end of this latter is slotted or bifurcated and is fitted with an antifriction-roller $f$, arranged to engage with the under side of a metal bar F within the change-drawer D. The forward end of this bar is cut away, as shown at $f'$, to form an inclined surface, which when the drawer D is closed allows the plunger to rise into its normal position, but when opened said incline draws down said plunger and in doing so causes a projecting pin G to engage with a pawl $g'$ and so operate the pivoted spring-hammer lever $g^2$ of the gong or bell $g^3$.

Inside the transparent receptacle A are arranged three pivoted shelves H H' H², one underneath the other, as illustrated. These pivoted shelves are connected by links $h$ with the plunger E in such a way that when said plunger is in its raised or normal position the top and bottom shelves will be closed and the middle one open.

The transparent receptacle A is preferably divided into compartments by partitions $a$, as shown, and slots $a'$ $a^2$, &c., of various sizes are formed in the upper part of said receptacle above each compartment to allow various-sized coins to be dropped through into their respective compartments.

A small bolt I may be used for securing the plunger E in either its raised or lowered position. When secured in its raised position, it prevents the change-drawer from being opened. When secured in its lowered position, it allows the change-drawer to be used as an ordinary till without causing the gong to sound each time. A hinged flap or door J, fitted with a lock and key, is provided for the purpose of allowing access to this bolt I when it is desired to secure the plunger E.

Instead of operating the plunger direct from the bar F in the drawer D it can be connected, as illustrated in Fig. 7, to a lever having an antifriction-roller at its end bearing upon the upper edge of said bar, said upper edge being formed with an incline $f'$ corresponding with that used on the lower edge in the previous arrangement.

Upon a sale being effected or the change-drawer opened the gong or bell $g^3$ is sounded, the plunger E is depressed, and the top and bottom shelves H $H^2$ turned into their open positions, while the middle one, H', is closed. The amount of the purchase money is then dropped into the transparent receptacle A and falls onto the shelf H' in full view of the customer.

When the plunger is released, it returns to its normal position and opens the middle shelf H', thereby allowing the coin or coins to drop onto the bottom shelf $H^2$, where they remain in view of the customer until another payment is made or the change-drawer opened, when the plunger is again depressed and the bottom shelf $H^2$ opened, so as to allow said coin or coins to fall into the locked drawer, and so on as each succeeding payment is made.

It will be evident that my improved cash receiver and indicator forms an efficient check on the salesman, as the amount of the purchase must be placed in the machine in full view of the customer and subsequently falls into a locked drawer which is not under the control of the salesman, so that no registration of the takings is required, as once the cash is inserted in the machine it cannot be afterward tampered with by an employee. The only cash to which the salesman has access is in the change-drawer, and he is responsible that the amount therein remains the same.

Having now particularly described and ascertained the nature of my said invention and in what manner the same is to be performed, I declare that what I claim is—

1. In a sight-payment cash register and indicator, the combination with a receptacle having transparent portion, of a series of shelves therein, a plunger connected with said shelves to operate the end ones in one direction and the intermediate one simultaneously in the opposite direction, a spring acting to normally hold said plunger in its elevated position, a roller carried by the lower end of said plunger and means having inclined portion movable with the drawer to actuate said roller as the drawer is moved substantially as described.

2. The combination with the transparent receptacle and the plunger normally forced upward and provided with depending means in the path of means on the change-drawer, of the pivoted shelves connected with the plunger to be actuated as described, a change-drawer governing by its movements the said plunger, and means for locking the plunger in its raised or lowered position, as and for the purposes set forth.

3. The combination with the transparent receptacle, the money-drawer and the change-drawer, of the vertically-movable plunger, the pivoted shelves in the transparent receptacle connected with the said plunger, a compartment between the transparent receptacle and the said drawers, means in said compartment for locking the plunger against movement, and a movable part permitting access to said locking means, substantially as described.

FRANCIS PARER.

Witnesses:
 EDWARD WATERS,
 WILLIAM HERBERT WATERS.